United States Patent
Perrow

(10) Patent No.: US 6,776,719 B2
(45) Date of Patent: Aug. 17, 2004

(54) TRIPOT UNIVERSAL JOINT

(75) Inventor: Scott Jay Perrow, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 30 days.

(21) Appl. No.: 10/172,689

(22) Filed: Jun. 14, 2002

(65) Prior Publication Data

US 2003/0232655 A1 Dec. 18, 2003

(51) Int. Cl.[7] .............................................. F16D 3/205
(52) U.S. Cl. ...................... 464/111; 464/905; 464/124
(58) Field of Search .................................. 464/111, 120, 464/123, 129, 905, 132, 124

(56) References Cited

U.S. PATENT DOCUMENTS

| | | | |
|---|---|---|---|
| 3,125,870 A | | 3/1964 | Orain |
| 4,379,706 A | * | 4/1983 | Otsuka et al. .............. 464/111 |
| 4,768,990 A | | 9/1988 | Farrell et al. ............... 464/111 |
| 4,786,270 A | * | 11/1988 | Iwasaki ...................... 464/111 |
| 5,391,013 A | * | 2/1995 | Ricks et al. ................ 464/111 |
| 5,571,047 A | * | 11/1996 | Stall et al. .................. 464/111 |
| 5,935,009 A | * | 8/1999 | Hosdez et al. ............. 464/111 |
| 5,989,124 A | * | 11/1999 | Goto et al. ................. 464/111 |
| 6,190,260 B1 | | 2/2001 | Flores et al. |
| 6,318,737 B1 | | 11/2001 | Marechal et al. |
| 6,390,926 B1 | | 5/2002 | Perrow |
| 6,497,621 B2 | * | 12/2002 | Kudo et al. ................. 464/111 |
| 6,533,667 B2 | | 3/2003 | Perrow et al. |

* cited by examiner

Primary Examiner—Lynne H. Browne
Assistant Examiner—Kenneth Thompson
(74) Attorney, Agent, or Firm—Michael D. Smith

(57) ABSTRACT

A telescopic tripot universal joint comprises an outer drive member having three longitudinal drive channels which include two opposing concave side surfaces having a parabolic profile, an inner drive member having three radial trunnions having a radially outward facing semi-spherical surface for tiltably mounting a drive ball assembly which has a bearing train disposed radially between an inner ball tiltably engaged to the trunnion and an outer ball having a tread face which directly opposes the concave side surfaces of the drive channels. The parabolic side surface has a radially outward portion having a smaller radius of curvature than a radial inward portion of the parabolic side surface. Moreover, the radius of the inward portion is equal to or greater than the maximum radius of the outer ball thereby assuring the tread face of the outer ball does not bind against the inward portion of the parabolic side surface on the unloaded side. This reduces universal joint studder as a result of ball assembly tilting about a Y-axis extending longitudinally with respect to the outer drive member.

11 Claims, 4 Drawing Sheets

TRIPOT UNIVERSAL JOINT

TECHNICAL FIELD

This invention relates to a universal joint and more particularly a tripot universal joint.

BACKGROUND OF THE INVENTION

Tripot universal joints are typically employed in automotive axial driveshafts and especially in front-wheel-drive vehicles between the transaxial differential and the driving wheel. The telescopic constant velocity joint such as the tripot should not only transmit the torque at various speeds, angles and telescopic positions but also prevent any vibrations of the engine from being transmitted through the joint and driveshaft to the driving wheel and the vehicle structure. In addition, when the universal joint operates at an angle it should not produce any osculating axial excitation which may be capable of initiating vibrations in the driveshaft or in the structure of the vehicle.

U.S. Pat. No. 3,125,870 granted to Michael Orain, Mar. 24, 1964, discloses a conventional telescopic type tripot universal joint of the prior art, which is one of the best stroking type universal joints available for osculating engine vibrations from the rest of the vehicle. However, these conventional prior art tripot universal joints due to their operating friction characteristics produce internally generated osculating axial forces which are related to the transmitted torque angles. During severe accelerations at low vehicle speeds these cyclic axial forces can be of sufficient magnitude to produce a shudder type disturbance which has a frequency equal to three times the shaft speed.

To reduce this shudder or vehicle ride disturbance, the generated axial forces must be reduced. This reduction is accomplished by tracking an outer ball or ball assembly of the tripot universal joint relative an axis of the housing. Effective tracking of the outer ball to reduce shudder must have a housing ball bore or channel designed to minimize the outer or ball assembly tip and/or reduce binding of the ball within the track when it does tip. However, ball tip occurs about two different axes, the X-axis and Y-axis. The problem with previous designs is the effectiveness at preventing ball pivoting about the Y-axis. The inability to prevent ball tip results in increased generated axial forces which lead to shudder.

SUMMARY OF THE INVENTION

A telescopic universal joint comprises a first drive member having a first longitudinal axis engaged flexibly to a second drive member having a second longitudinal axis. The first and second longitudinal axis are co-linear to one another, or zero degreed, when the joint is not flexed. The first drive member defining three longitudinal drive channels spaced circumferentially from another. Each channel has two opposing concave side surfaces spaced circumferentially apart by a back surface facing radially inward. Three trunnions of the second drive member are disposed respectively within the three channels. Each trunnion has a radial axis all lying within an imaginary plane and intersecting at a spider center lying along the second longitudinal axis.

Rotating and wobbling about each trunnion is a ball assembly having an outer ball which is in rolling contact with one of the two opposing concave side surfaces of the first member. Each side surface has a lateral cross section profile which is substantially parabolic in shape wherein a radius of curvature becomes smaller as the profile extends radially outward with respect to the first drive member.

Preferably, an outward portion of the side surface is formed contiguously between the back surface and an inward portion of the side surface. The lateral cross section profiles of the inward and outward portions forming the parabolic profile of the side surface. The radius of the outward portion profile is smaller than a radius of the inward portion profile, and the radius of the inward portion profile is larger than a maximum radius of the outer ball extending from a center point of the ball assembly to a tread face of the outer ball which directly opposes the side surfaces of the channel.

An advantage of the present invention is the reduction of outer ball binding with the channel by eliminating contact between the tread face of the outer ball and the inward portion of the unloaded side surface of the channel regardless of joint flexing.

Yet another advantage of the present invention is the reduction of universal joint studder.

BRIEF DESCRIPTION OF THE DRAWINGS

The presently preferred embodiment of the invention is disclosed in the following description and in the accompanying drawings wherein.

DETAILED DESCRIPTION OF THE PREFERRED EMBODIMENT

Figure 1:
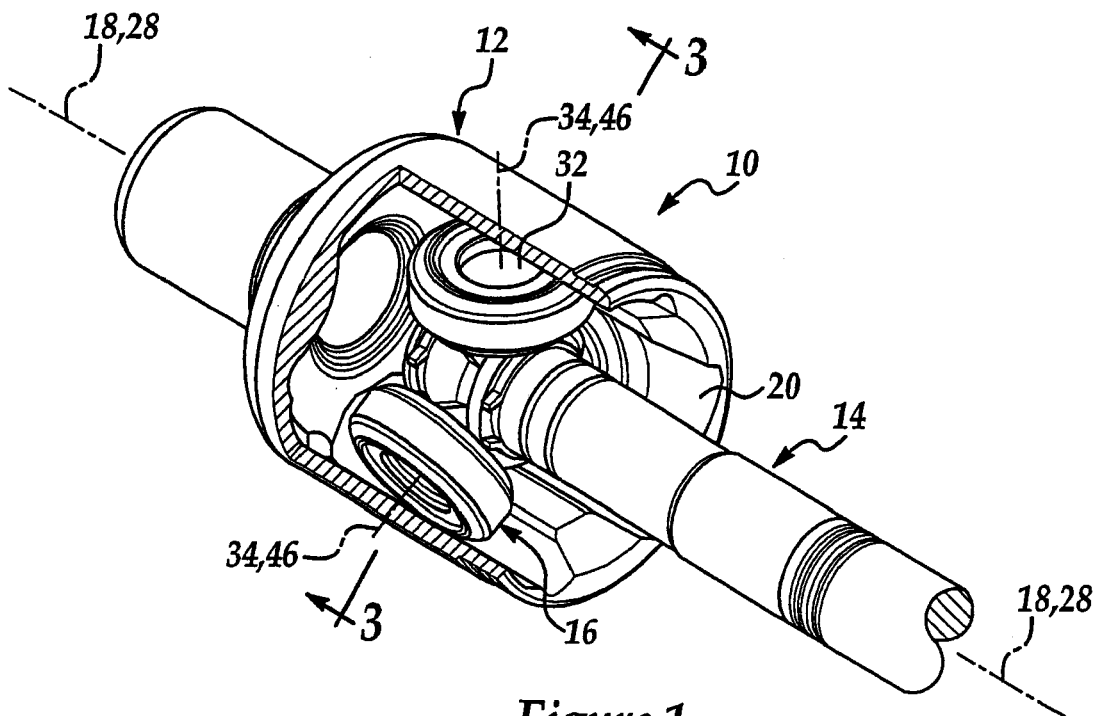
FIG. 1 is a longitudinal perspective view of a tripot universal joint of the present invention with portions of a first drive member removed to show internal detail.
Figure 2:
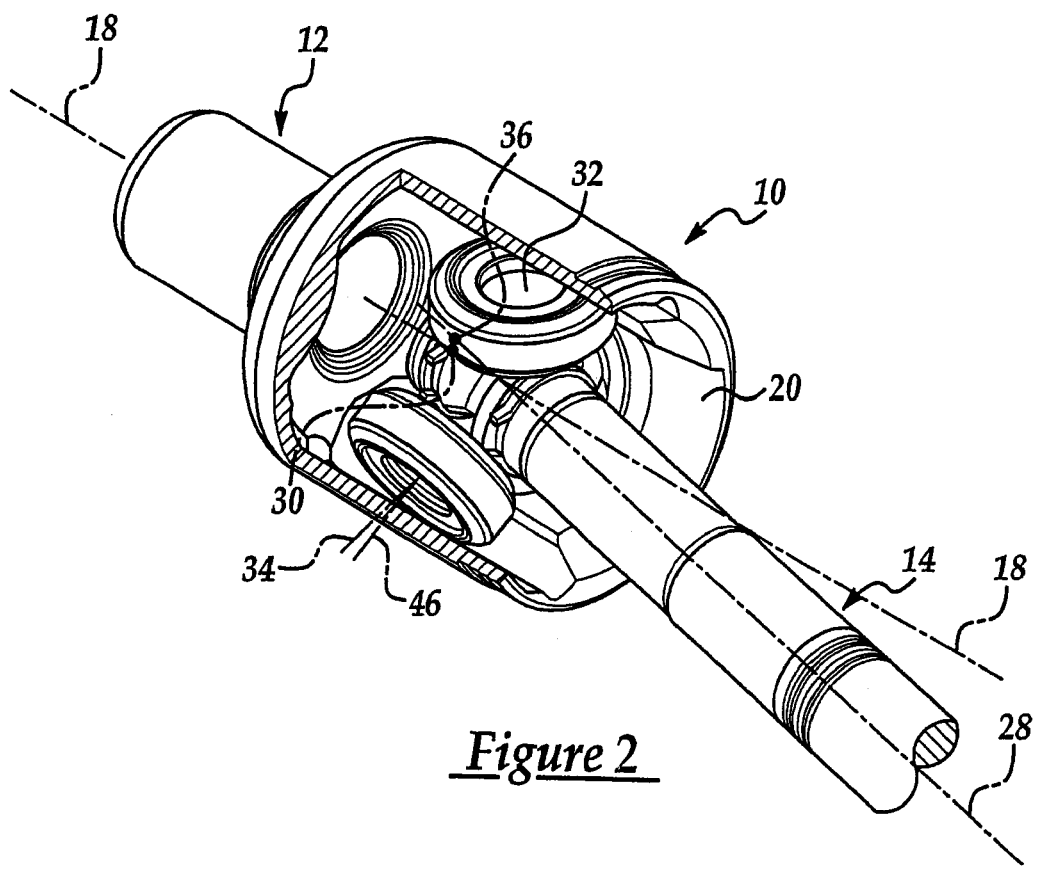
FIG. 2 is a perspective view of the tripot universal joint with a second member of the universal joint tilted with respect to the first drive member.

Referring now to the drawings the invention is illustrated in conjunction with a tripot universal joint 10 which comprises a first or outer drive member 12, a second or inner drive member 14 and a plurality of drive roller or semi-spherical ball assemblies 16 shaped substantially like and oblate spheroid. The outer drive member 12 has a longitudinal axis 18 about which it rotates and three radial drive channels 20 which are equally spaced at substantially 120 degrees from each other. The longitudinal drive channels 20 may be straight, having center lines which are parallel to the longitudinal axis 18 as shown in the drawings or helical, having center lines which are at a small angle such as six degrees, with respect to the longitudinal axis 18. In any event each radial drive channel 20 has two opposing concave side surfaces 22, 24 separated circumferentially by a longitudinal back surface 26 which faces radially inward. The inner drive member 14 has a longitudinal axis 28 about which it rotates. The longitudinal axis 18 and 28 coincide or are co-linear when the tripot universal joint 10 is at zero angle, as shown in FIG. 1, and intersects at a point on the longitudinal axis 18 which is based from a joint center 30 when the tripot universal joint 10 is articulated or bent at an angle as shown in FIG. 2.

Figure 3:
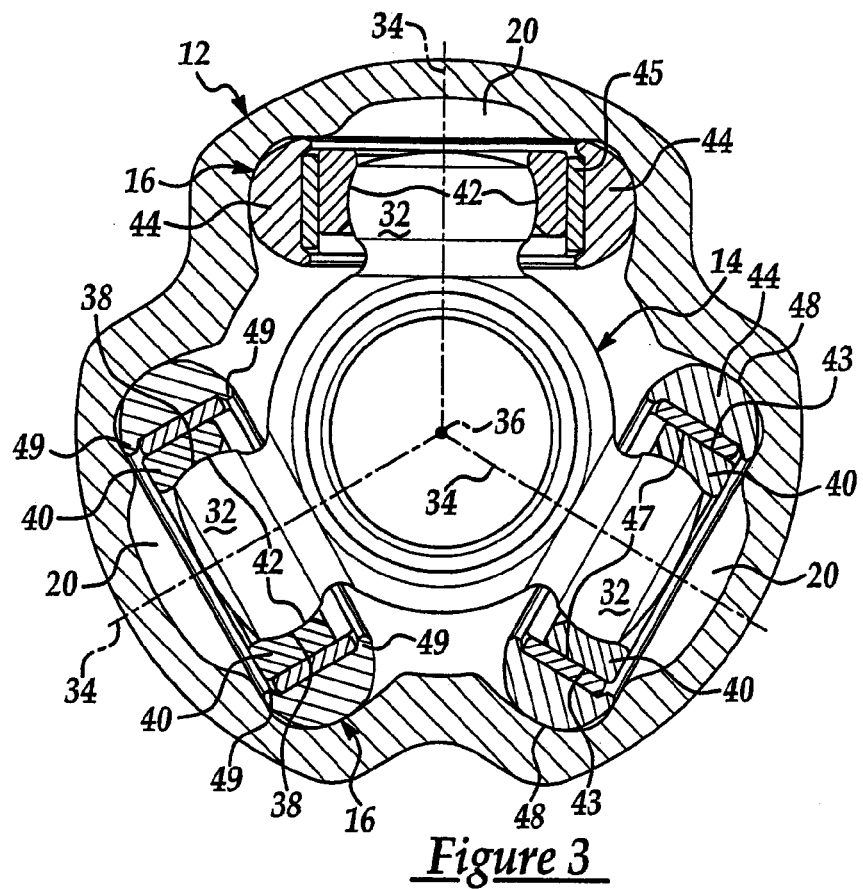
FIG. 3 is a lateral cross section view of the tripot universal joint taken along line 3—3 viewing in the direction of the arrows of FIG. 1.

The inner drive member 14 has three radial trunnions 32 equally spaced at 120 degrees from each other on co-planar radial axis 34 which intersect the longitudinal axis 28 perpendicularly at a spider center 36, as best shown in FIG. 3. The spider center 36 which lies on the longitudinal axis 18 of the outer drive member 12 at zero angle is displaced radially from the longitudinal axis 18 and orbits around the joint center 30, as best shown in FIG. 2, at three times the joint speed when the tripot universal joint 10 is articulated and rotated at a given speed.

Each one of the radial trunnions 32 have a semi-spherical surface 38 which is concentric to the radial axis 34. The ball assemblies 16 are mounted on the radial trunnions 32 both rotatably and pivotally. Disposed directly radially outward from the semi-spherical surface 38 of the trunnion 32 is an annular inner roller or ball 40 which has an inner radial concave mating surface 42 which conforms to the semi-spherical surface 38 of the trunnion 32 so that the ball assembly 16 can tilt or pivot with respect to the radial axis 34 of the trunnion 32. An annular outer ball 44 of the ball assembly 16 rotates with respect to the inner ball 40 via a full compliment of needles 45 disposed directly radially between the outer ball 44 and the inner ball 40. The compliment of needles are best shown as an elevational view in FIG. 4.

The inner ball 40 has a substantially cylindrical outer surface 43 which faces a substantially cylindrical inner surface 47 of the outer ball 44. The compliment of needles 45 rotate directly between the outer and inner surfaces 43, 47 and are held axially in place by two annular thrust shoulders 49 projecting radially inward from the outer ball 44. The movement between the outer ball 44 and the inner ball 40 is rotational about a centerline 46. The moving relationship between the inner ball 40 and the respective trunnion 32 is generally pivotal with minimal rotation, thereby lending itself to wobble.

The center line 46 is co-linear to the radial axis 34 of the trunnion 32 when the first longitudinal axis 18 of the outer drive member 12 is disposed co-linear to the second longitudinal axis 28 of the inner drive member 14.

Figure 4:
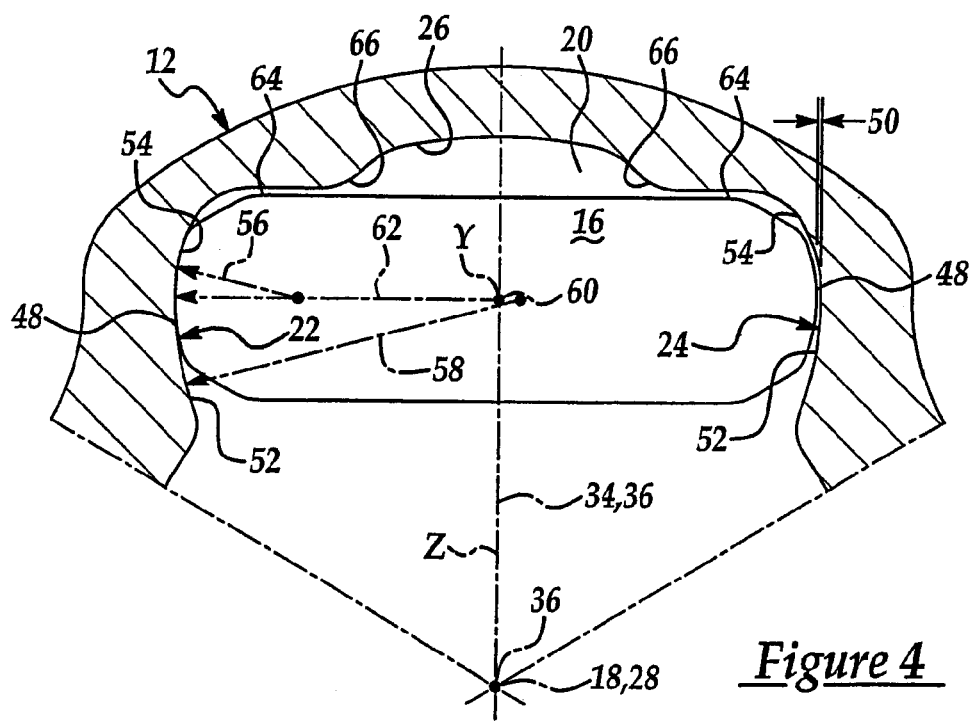
FIG. 4 is a partial lateral cross section view of the tripot universal joint showing a ball assembly of the second drive member disposed within a longitudinal drive channel carried by the first drive member when a first longitudinal axis of the first drive member is disposed co-linearly to a second longitudinal axis of the second drive member.
Figure 6:
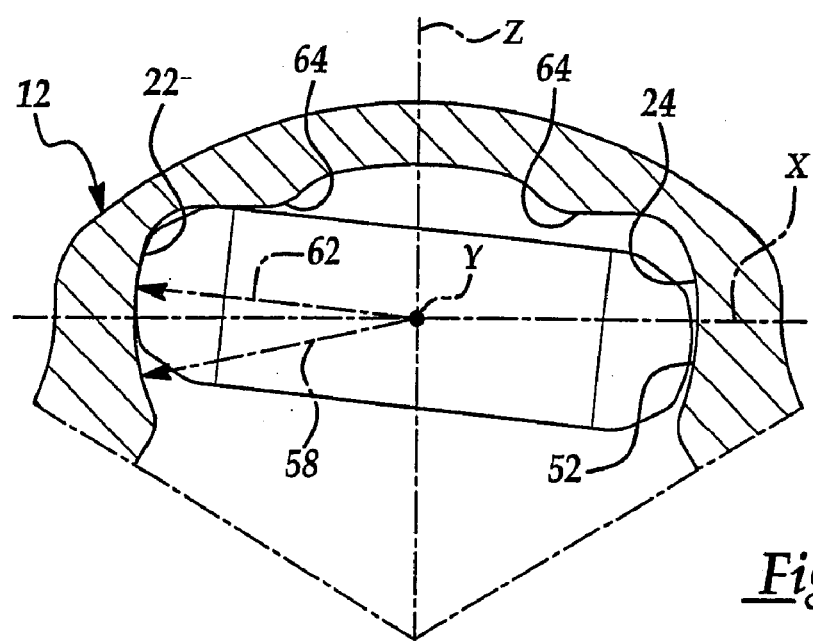
FIG. 6 is a partial lateral cross section view similar to FIG. 4 except that the first longitudinal axis of the first drive member is not disposed co-linearly to the second longitudinal axis of the second drive member.

The outer ball 44 has a radially outward facing and convex tread face 48 which rolls directly upon the side surface 22 or the side surface 24, otherwise referred to as the loaded side surface. Whichever side surface is loaded is dependent upon the rotation direction of the universal joint 10. The unloaded or opposing side surface, being side surface 24 as illustrated in FIG. 4, is spaced from the diametrically opposite side of the tread face 48 by a clearance 50 when the longitudinal axis 18 of the outer drive member 12 is co-linear to the longitudinal axis 28 of the inner drive member 14, or at zero angle, and wherein the centerline 46 of the ball assembly 16 is also at substantially zero-angle to the radial axis 34 of the trunnion 32. The drive ball assembly 16 is thereby free to roll within the drive channel 20 of the housing or outer drive member 12. When the drive members 12, 14 are not at zero angle to one-another, the ball assemblies 16 are slightly cocked within the channel 20 causing the outer ball 44 to run against or close upon portions of the back surface 26 and/or the side surface 24 as the outer ball 44 rolls against the side surface 22, as best illustrated in FIG. 6. Because the side surfaces 22, 24 are substantially parabolic in shape, the tread face 48 has greater clearance than prior art, as best shown in FIGS. 7 and 8, and therefore will not pivot hard against the side surface 24 to such an extent that the ball assembly 16 binds within the channel 20.

Figure 5:
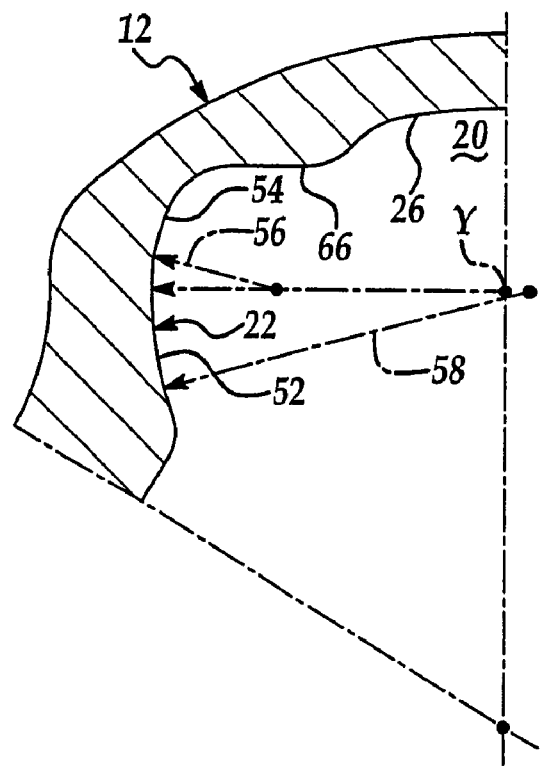
FIG. 5 is a partial cross section view of the first drive member taken from the circle labelled 5 of FIG. 4.

Referring to FIGS. 4 and 5, concave side surfaces 22, 24 are both divided or bisected longitudinally with respect to the outer drive member 12 into a longitudinal concave inward portion 52 and a longitudinal concave outward portion 54 which is formed contiguously between the back surface 26 of the drive channel 20 and the concave inward portion 52 of the respective side surface 22, 24. To minimize binding of the outer ball 44 against the inward portion 52 of the side surfaces 22, 24 and thereby minimize joint shudder, the lateral cross-section profile of the concave side surfaces 22, 24 are substantially parabolic in shape wherein the lateral cross section profile of the outward portion 54 has a general radius 56 which is smaller than a general radius 58 of the lateral cross section profile of the concave inward portion 52. The tread face 48 has an equator orientated at its maximum diameter. The equator is generally in contact with the loaded side surface 22 or 24 at all times and is spaced from a center point 60 of the ball assembly 16 by a maximum radius 62 which extends radially inward from the equator and transversely to the center point 60 of the assembly lying along the centerline 46. The maximum radius 62 of the ball assembly is half the maximum diameter, and is less than or equal to the profile radius 58 of the inner portion 52 of the respective side surfaces 22, 24. The convex profile of the tread face 48 has a radius substantially equal to the general radius 56 of the outward portion 54.

Referring to FIGS. 3–6, the three dimensional movement of ball assembly 16 (i.e. rotation and wobble) may better be described within an X-Y-Z axes orientation. The outer ball 44 rotates generally about the Z-axis which lies along the radial axis 34 of the trunnion 32. The Y-axis extends longitudinally with respect to the outer drive member 12, and the X-axis is generally tangential or extends laterally to member 12 and is substantially co-linear to the maximum diameter of the ball assembly 16. The inner ball 40 and subsequently the ball assembly 16 wobbles as it rotates about the Z-axis via pivoting about the X-axis and/or the Y-axis or any axis lying within the X-Y plane. The universal joint shudder, previously described, is a result of the ball assembly 16 wobble, and more specifically, the pivoting action dedicated about the Y-axis.

Figure 7:
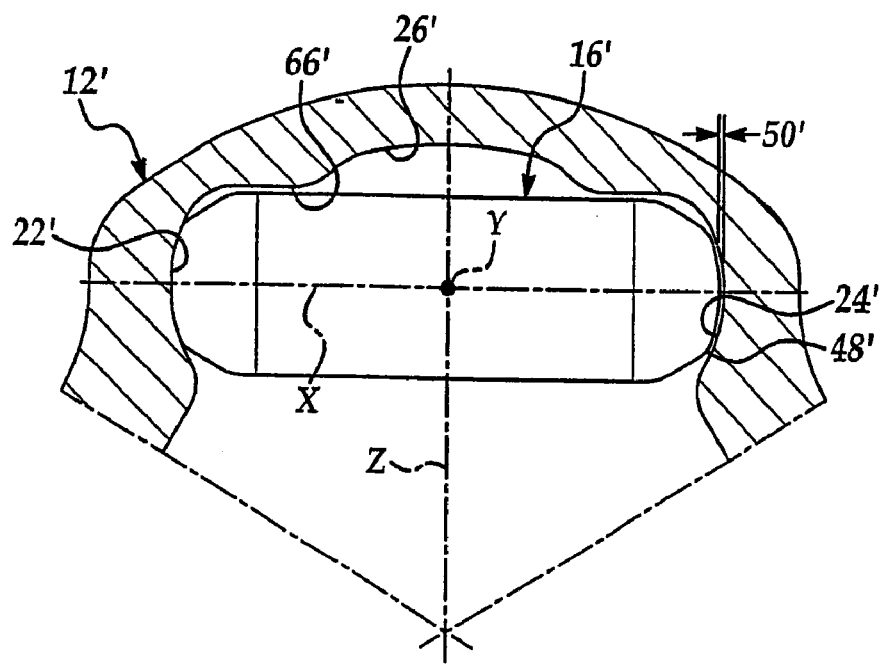
FIG. 7 is a partial lateral cross section of a prior art tripot universal joint when the longitudinal axis of the first drive member is co-linear to the longitudinal axis of the second drive member.
Figure 8:
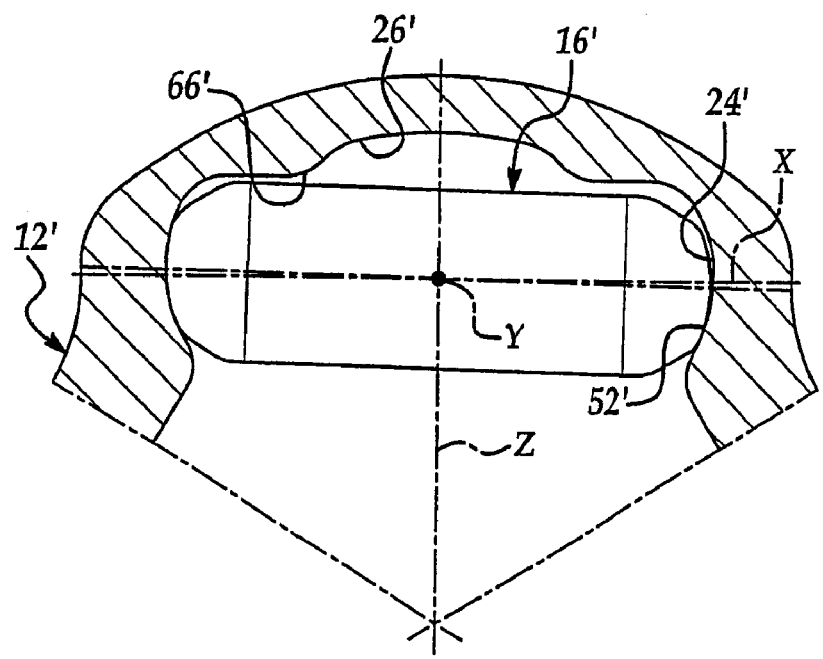
FIG. 8 is a partial cross section view of the prior art similar to FIG. 6 except that the longitudinal axis of the first and second drive members are not co-linear.

Referring to FIGS. 7 and 8, traditionally when the roller assembly 16' pivots about the Y-axis the unloaded side of the tread face 48' would bind or impact against the inward portion 52' of the unloaded concave side surface 24' as illustrated. This binding would cause shudder, such as in a steering wheel column application, wherein the operator of a vehicle could feel the annoying vibration. However, in the present invention, the radius 58 of the longitudinal concave inward portion 52 of both the side surfaces 22, 24 is greater than the maximum radius 62 of the tread face 48. This radial relationship assures that the clearance 50 is substantially maintained even during the wobbling action of the roller assembly 16, thereby preventing binding of the unloaded concave side surface 24 (as illustrated) with the otherwise unloaded convex tread face 48.

As best shown in FIG. 5, an outward radial side wall 64 of the outer ball 44 contacts a guide wall 66 carried by and extended longitudinally lengthwise along the back-surface 26 of the drive channel 20 when the longitudinally axis 18, 28 are furthest from zero angle. Each back surface 26 has two of these guide walls 66 disposed adjacent to the respective concave side surfaces 22, 24. Referring to FIG. 8, the ball assembly of the prior art seldom, if at all contacts the back surface 26' of the drive channel 20'.

While the forms of the above mentioned herein disclose herein disclosed constitute a presently preferred embodiment many others are possible. It is not intended herein to mention all the possible equivalent forms or ramifications of the invention; it is understood that the terms used here are merely descriptive rather than limiting and various changes may be made without departing from the spirit or scope of the invention.

I claim:

1. A tripot universal joint comprising:
   a first drive member having a first longitudinal axis and three longitudinal drive channels disposed parallel to the longitudinal axis and equally spaced circumferentially from one another, each one of the three longitudinal drive channels defined by two opposing concave side surfaces and a back surface, the back surface facing radially inward with respect to the first drive member, the opposing concave side surfaces disposed parallel to one another and separated circumferentially with respect to the first drive member by the back surface;
   a second drive member having a second longitudinal axis and three radial trunnions equally spaced circumferentially from one another and on respective coplanar radial axes which intersect the second longitudinal axis at a spider center, each one of the three trunnions having part-spherical outer convex surface disposed in the respective longitudinal drive channels adjacent the opposing concave side surfaces of the first drive member;
   three ball assemblies constructed and arranged to rotate and wobble about the radial axis of the respective trunnion, each one of the three ball assemblies contacting and encircling the circular surface of the respective trunnion, each one of the three ball assemblies having an inner ball with a concave inner surfaces captured on said outer convex surface of the respective trunnion on which it is mounted a semi-spherical outer ball being in rolling contact with only one of the two opposing concave side surfaces of the first drive member and slideable axially relative to said inner ball and said trunnion on which it is mounted; and
   the opposing concave side surfaces of the first drive member having a lateral cross section profile being substantially parabolic in shape, wherein a radius of curvature becomes smaller as the profile extends radially outward with respect to the axis of the first drive member.

2. The tripot universal joint set forth in claim 1 comprising;
   each one of the opposing side surfaces having a longitudinal concave inward portion and a longitudinal concave outward portion, the outward portion disposed between and forming contiguously into the inward portion and the back surface; and lateral cross section profiles of the inward and outward portions forming the parabolic profile of the side surface, the profile of the inward portion having a radius which is larger than a radius of the profile of the outward portion.

3. The tripot universal joint set forth in claim 2 comprising;
   the ball assembly having a center line about which the outer ball rotates, the center line being co-linear to the radial axis of the trunnion when the first longitudinal axis of the first drive member is co-linear to the second longitudinal axis of the second drive member;
   the outer ball having a radially outward facing semi-spherical tread face engaged to one of the two opposing side surfaces and a maximum radius which extends radially and perpendicularly outward from a center point of the ball assembly lying along the center line to the tread face; and
   wherein the maximum radius is equal to or smaller than the radius of the inward portion profile of the side surface.

4. The tripot universal joint set forth in claim 3 wherein each one of the three roller assemblies has a bearing train disposed radially between the trunnion and the outer ball.

5. The tripot universal joint set forth in claim 4 wherein the bearing train is a series of needle bearings disposed directly between a cylindrical inner surface of the outer ball and a cylindrical outer surface of the inner ball.

6. The tripot universal joint set forth in claim 5 wherein the outer ball has two thrust shoulders projecting radially inward from the cylindrical inner surface of the outer ball, the series of needle bearing being disposed axially between the two thrust shoulders with respect to the center line of the ball assembly.

7. The tripot universal joint set forth in claim 6 comprising;
   each one of the longitudinal drive channels of the first drive member having two guide walls extending lengthwise longitudinally along the channel and projecting radially inward from and defined by the back surface, the guide walls being spaced circumferentially apart; and
   an outward radial side wall of each one of the outer balls contacting the guide walls carried within the respective channels of the first drive member when the first longitudinal axis of the first drive member is not co-linear to the second longitudinal axis of the second drive member.

8. The tripot universal joint set forth in claim 7 wherein the first guide wall forms contiguously into the first parabolic side surface and the second guide wall forms contiguously into the second parabolic side surface.

9. The tripot universal joint set forth in claim 3 wherein one of the two opposing concave side surfaces of the first member is a load surface and the other opposing concave side surface is an unloaded surface, the load surface contacting the tread face of the outer ball and the unleaded surface being spaced from the tread face by a clearance when the first longitudinal axis is co-linear to the second longitudinal axis.

10. A tripot universal joint comprising:
    a first drive member having a first longitudinal axis and three longitudinal drive channels disposed parallel to the longitudinal axis and equally spaced circumferentially from one another, each one of the three longitudinal drive channels defined by two opposing concave side surfaces and a back surface, the back surface facing radially inward with respect to the first drive member, the opposing concave side surfaces disposed parallel to one another and separated circumferentially with respect to the first drive member by the back surface;

a second drive member having a second longitudinal axis and three radial trunnions equally spaced circumferentially from one another and on respective coplanar radial axes which intersect the second longitudinal axis at a spider center, each one of the three trunnions having a part-spherical outer convex surface disposed in the respective longitudinal drive channels adjacent and being in confronting relation with the opposing concave side surfaces of the first drive member;

three ball assemblies constructed and arranged to rotate and wobble about the radial axis of the respective trunnion, each one of the three ball assemblies contacting and encircling the circular surface of the respective trunnion, each one of the three ball assemblies having an inner ball with a concave inner surfaces captured on said outer convex surface of the respective trunnion on which it is mounted an outer ball having a tread face being in rolling contact with only one of the two opposing concave side surfaces of the first drive member and slideable axially relative to said inner ball and said trunnion on which it is mounted, the outer ball having a maximum radius measured radially inward from the tread face to a center line about which the ball assembly rotates; and the opposing concave side surfaces each having a longitudinal concave inward portion and a longitudinal concave outward portion, the outward portion disposed between and forming contiguously into the inward portion and the back surface, the inward and outward portions each having lateral cross section profiles wherein a radius of the inward portion profile is larger than a radius of the outward portion profile, and wherein the maximum radius of the outer ball is equal to or less than the radius of the inward portion profile.

11. The tripot universal joint set forth in claim 10 wherein a lateral profile of the tread face is convex and has a tread radius which is substantially equal to the radius of the outward portion profile of the concave side surface.

* * * * *